United States Patent [19]

Boy-Marcotte et al.

[11] 4,294,232
[45] Oct. 13, 1981

[54] SOLAR COLLECTOR

[75] Inventors: Jean-Louis Boy-Marcotte, Orsay; Henri D. M. Junot, Paris; Richard J. A. M. Grossin, Rueil-Malmaison; Philippe J. M. R. Chevalier, Garancieres, all of France

[73] Assignee: Bertin & Cie, Plaisir, France

[21] Appl. No.: 101,575

[22] Filed: Dec. 10, 1979

[30] Foreign Application Priority Data

Dec. 8, 1978 [FR] France .............................. 78 34553

[51] Int. Cl.³ .............................................. F24J 3/02
[52] U.S. Cl. .................................... 126/443; 126/447; 126/441; 126/450
[58] Field of Search ................. 126/438, 439, 442–448, 126/450, 441

[56] References Cited

U.S. PATENT DOCUMENTS

| 4,080,954 | 3/1978 | Wilde et al. | 126/443 |
| 4,084,579 | 4/1978 | Yu | 126/446 |
| 4,119,085 | 10/1978 | Knowles et al. | 126/443 |
| 4,185,616 | 1/1980 | Johnson | 126/443 |
| 4,204,521 | 5/1980 | Mattson | 126/446 |

FOREIGN PATENT DOCUMENTS

| 2518926 | 4/1975 | Fed. Rep. of Germany | 126/443 |
| 2530152 | 2/1977 | Fed. Rep. of Germany | 126/446 |
| 2838883 | 4/1979 | Fed. Rep. of Germany | 126/443 |
| 2308883 | 11/1976 | France | 126/443 |
| 7409868 | 1/1976 | Netherlands | 126/443 |

Primary Examiner—James C. Yeung
Attorney, Agent, or Firm—A. W. Breiner

[57] ABSTRACT

A solar collector is designed for converting solar radiation into heat and transferring the heat thus collected, by means of a chamber formed of a window exposed to the sun and allowing passage of solar radiation, and of a bottom or opposite end-face. This radiation is absorbed by adequate means fitted inside this chamber, and the heat it entails is carried off outside the latter. Both the window and the bottom which form the chamber, are made of glass elements hermetically sealed to one another along their periphery by low-melt glass welding.

8 Claims, 10 Drawing Figures

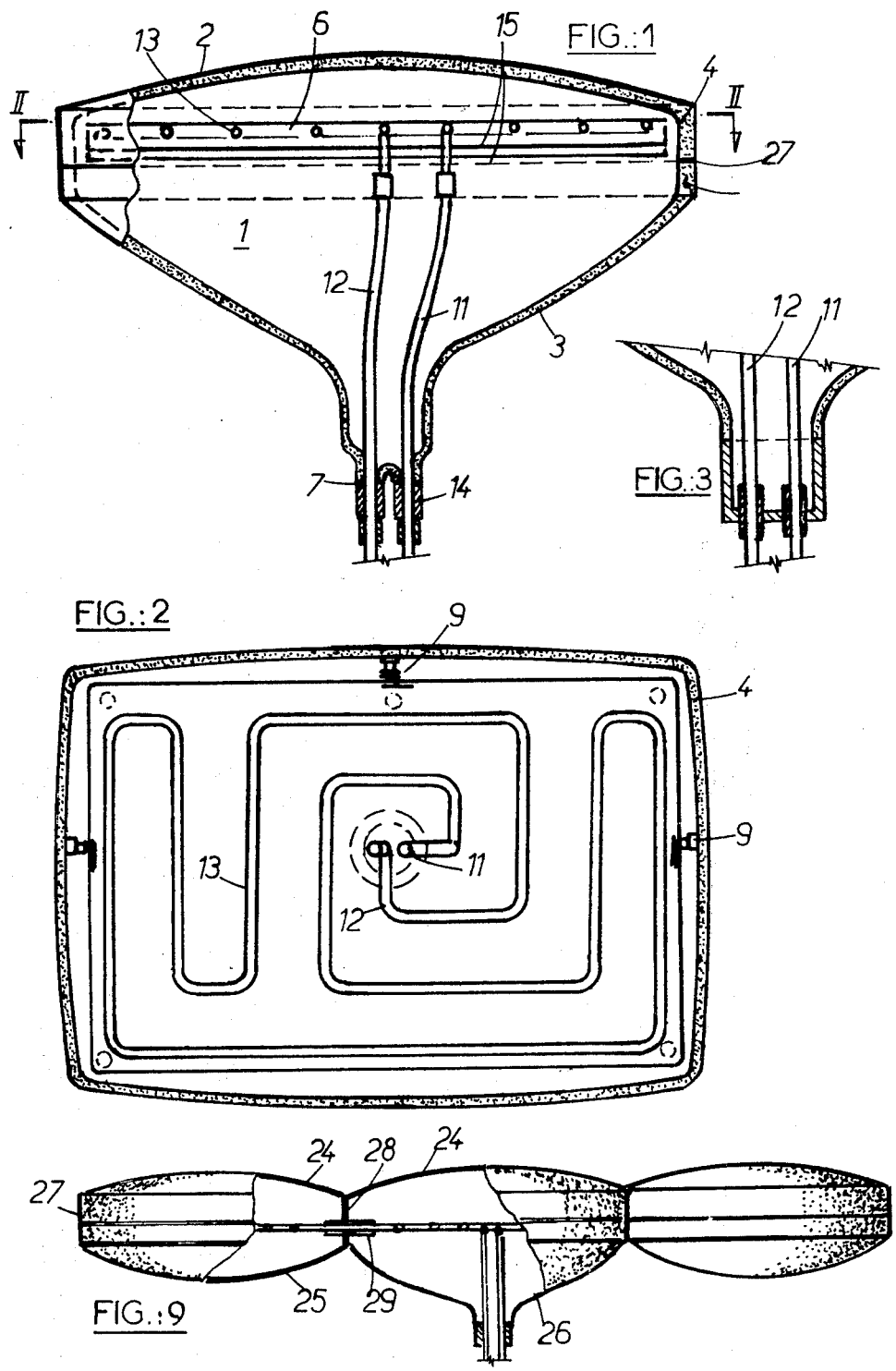

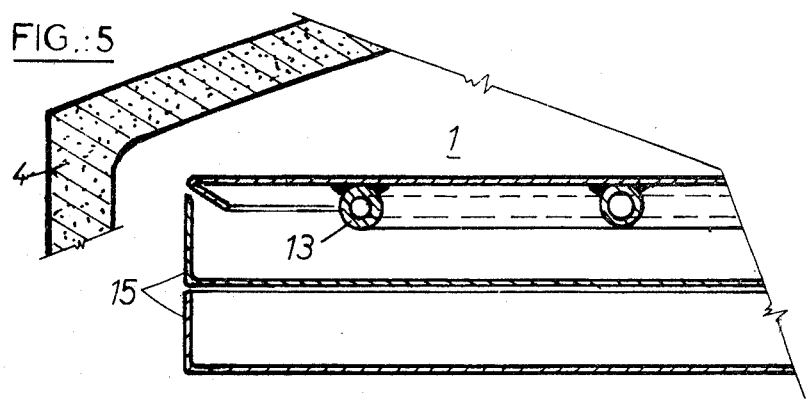
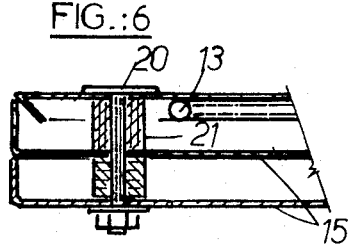
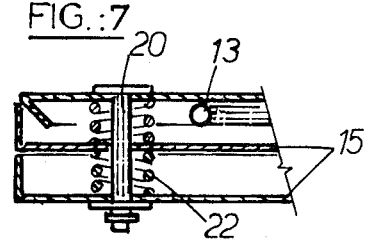
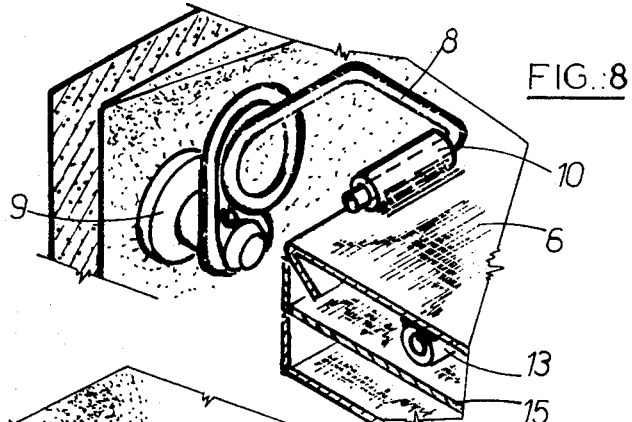
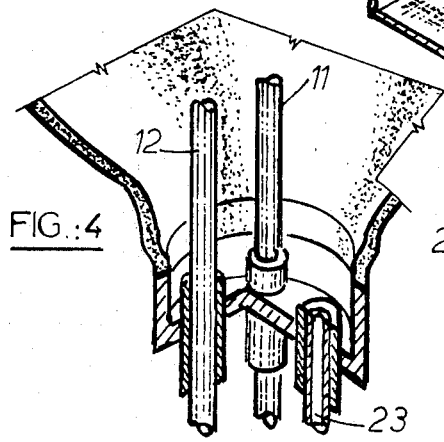
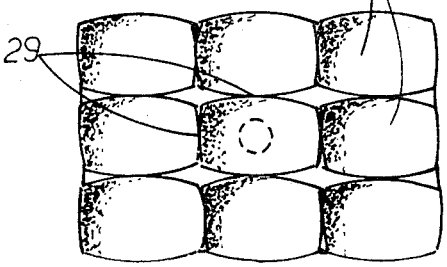

SOLAR COLLECTOR

The present invention relates to a solar collector for converting solar radiation into heat and for transmitting the heat picked up in this way to utilization means and more particularly to a solar energy collector of the kind having a flat absorber.

As well-known per se, solar collectors of this type have a chamber formed by a window exposed to the sun and allowing solar radiation to pass through and by an end-face, energy absorbing means disposed in the chamber facing the window, and means commonly consisting of a conduit through which flows a fluid for transporting the collected heat.

The present invention provides improvements to this type of collector, more particularly with the object of achieving, inside the chamber, a durable high vacuum which eliminates all loss due to gaseous conduction.

For in such types of collectors the window and the end-face are made of different materials, being respectively transparent for the window and opaque for the end-face, and their interconnection poses sealing problems.

In order to overcome this difficulty, the only evacuated solar collectors at present developed are formed by a tubular chamber, which consequently limits the unit surface area of the collector and poses problems of fragility.

It is a first particularity of this invention that the window and end-face of the collector are formed by two glass elements hermetically united along their peripheries by a seal obtained with a paste of molten glass at a temperature of 400 degrees Centigrade.

This welding technique for joining two glass elements together is well known per se, particularly by television tube manufacturers, but has never been applied to the manufacture of solar collectors.

Such transfer of technology is by no means obvious, however, since it involves two techniques intended for entirely different domains, to wit electronics and heat engineering.

This approach to the manufacture of solar collectors employs means already used for mass-producing television tubes and thus enables the cost price to be substantially reduced.

In accordance with a first embodiment of this invention, the window is formed by a slightly cambered transparent dome and the end-face is in the shape of a cone open at its apex. The dome and the cone are sealed along their peripheries, as indicated precedingly.

By way of an alternative, the dimensions of the collector can be markedly greater than those of a television screen. The dome can be made thinner than such screen by increasing its camber. However, the screen dimensions are limited by industrial constraints to about 0.5 $m^2$ per collector, which is equivalent to a square with sides measuring 0.70 m or to a circle 0.80 m in diameter.

The respectively cambered and conical shapes of the dome and the end-face make it possible to compensate for the forces exerted by the surrounding atmospheric pressure on the collector, without recourse to internal bracing.

In cases where the section of the chamber is substantially rectangular it is possible to have a combination of juxtaposed collectors without wasting any space.

In accordance with a second form of embodiment of the invention, the chamber of the solar collector is formed by a plurality of preferably intercommunicating contiguous compartments. Such chamber is constructed in two portions, to wit a window formed by a plurality of domes rigidly connected to internal spacer-forming intermediate partition walls, and an end-face formed by domes rigidly united to a cone. The two assemblies are sealed together along their periphery, and the intermediate partition-walls may merely bear against each other in pairs.

It is a second particularity of this invention that the solar radiation absorbing means consist of a flat receiver formed by a thin metallic (e.g. copper, steel or aluminium) plate whereby to limit the thermal inertia of the collector. The face of this plate exposed to the sun is so treated as to obtain selective optical properties, to wit good solar radiation absorption and low infrared emission. For instance, such plate may be coated with chromium black.

It is a third particularity of this invention that the means for collecting and transporting the heat picked up are disposed on that face of the receiver which is not exposed to the sun. Such means consist of tubular coils disposed in the different compartments and connected in series or in parallel and the input and output conduits of which pass through the apex or neck of the cone.

In cases where the chamber is formed by a plurality of contiguous compartments in accordance with the second form of embodiment hereinbefore described, the different coils are connected to one another in succession by means of unions disposed in ports provided in the intermediate partition walls. In this particular embodiment there is preferably provided only one input conduit and only one output conduit which are accommodated in the neck of the single cone of the chamber.

In accordance with this invention, a high vacuum (of the so-called secondary-vacuum kind, in the region of $10^{-4}$ Torr) which is unaffected by the passage of time is generated inside the compartment containing the receiver, thereby to completely eliminate losses by gaseous conduction as well as losses by convection.

A glass-metal weld is then effected at the level of the neck in order to isolate the compartment from the surrounding atmosphere, as is well-known to the specialist in the vacuum art. The vacuum is generated by fitting negative pressure-generating means to an end stub, while the use of a "getter" enables the molecules of residual gas to be absorbed before sealing off the chamber.

Likewise in accordance with this invention, radiation losses from the rear face of the receiver are greatly reduced by providing an arrangement of radiant screens made of metal sheet having low infrared emissivity. Examples of such screens are thin stainless-steel, aluminium or copper sheets, or aluminized plastic sheets.

The number of screens required is small (from one to four depending on their emissivity), and their geometry is so chosen as to limit edge effects, or loss by lateral radiation, preferably by turning up the ends of the screens until the gap between the absorber and the first screen and between consecutive pairs of screens is very small.

The receiver and the screens are restrained by a weakly conducting light structure that limits "heat bridge" effects. An example of such structure would be lateral suspension means from the edges of the compartment, using an arrangement of stainless-steel tubes or rods, flexible lines made of steel, resin/glass-fibre composite materials, or any other convenient product.

The second form of embodiment in particular permits of constructing large size solar collectors having the following advantages:

no losses through intermediate unions,
a saving of material,
a gain in manufacturing time: the glass-glass welding, the glass-metal welding and the evacuating process are performed only once for a collector with multiple compartments.

The type of collector herein described makes it possible, at any given site, to collect approximately twice as much energy annually than a conventional flat collector, and this at comparable cost for quantity production.

The description which follows with reference to the accompanying non-limitative exemplary drawings will give a clear understanding of how the invention can be carried into practice.

In the drawings:

FIG. 1 shows in longitudinal section a first embodiment of the invention;

FIG. 2 is a section taken on the line II—II of FIG. 1;

FIGS. 3 and 4 are sectional illustrations on an enlarged scale of alternative embodiments of the cone neck;

FIG. 5 is a sectional enlarged view corresponding to FIG. 1;

FIGS. 6, 7 and 8 are portrayals of the manner of securing the receiver and screens;

FIG. 9 is a fragmental sectional illustration of a second form of embodiment of the invention; and FIG. 10 illustrates an exemplary disposition of the second form of embodiment.

Reference to FIGS. 1 and 2 shows a first embodiment of a solar collector according to this invention. This solar collector is formed by a chamber 1 having a window exposed to the sun, and an end-face. The window is formed by a slightly cambered transparent dome 2 and the end-face by a cone 3 open at its apex 7. In accordance with the invention, the dome and the cone are made of glass and are extended respectively by substantially cylindrical elements 4 and 5 of equal diameter. These elements are disposed facing each other and are joined together by a continuous seal along the entire periphery. Such seal, well-known per se to television tube manufacturers, is obtained with molten glass at a temperature of the order of 400 degrees C. A seal of this kind can be made over a great width and with excellent sealing properties since both constituents of the chamber are made of glass. There are thereby obtained chambers having solar radiation collecting surfaces of substantial area having regard for their breadth.

Housed within the chamber are the thermal energy absorbing means and the means for collecting and transporting this energy. Obviously, such means are installed in the chamber before the precedingly described sealing operation is performed.

The solar radiation absorbing means is a flat receiver formed by a thin copper or aluminium plate 6. As stated hereinbefore, such plate may be treated for example by having its face exposed to the sun coated with chromium black. Plate 6 is fixed to the chamber and, in this exemplary embodiment, is suspended from dome element 4 by a low-conduction lightweight structure which limits "heat bridge" effects.

Such structure (see FIG. 8) includes a rod 8 coiled to provide a suspension effect which is fastened to a stud 9 fast with the dome and which is rigidly connected to plate 6 through the agency of a sleeve 10. Alternatively, said structure could include a stainless-steel rod fastened to stud 9 and screwed onto the last radiant screen.

The means for collecting and transporting the heat picked up are disposed on that face of the receiver which is not exposed to the sun and consist of input and output tubes 11 and 12 connected by a coiled tube 13 which is brazed or welded in such manner as to commence and terminate near the centre of plate 6 (see FIG. 2).

Tubes 11 and 12 penetrate into the chamber through the apex or open neck 7 of the cone. Sealing is provided by a glass-metal weld 14 effected level with the neck (see FIGS. 3 and 4).

In order to limit radiation losses from the rear face of the receiver, there is provided an arrangement of radiant screens formed by metal sheets 15 having low infrared emissivity. Such screens may be two in number (FIG. 1) or, more generally, from one to four. The edges of the screens are raised in order to limit edge effects (loss by lateral radiation).

The radiant screens are secured to one another and to the plate by threaded rods at their ends 20 and are spaced with spacers 21 (FIG. 6) or springs 22 (FIG. 7) inserted therebetween.

The vacuum in the region of $10^{-4}$ Torr, which is maintained through time, prevailing within the chamber is obtained by applying a depression-generating apparatus to the neck of the cone over stub 23 (FIG. 4) while at the same time stoving the collector to a temperature of approximately 50 degrees Centigrade in order to degasify the surfaces. When the required pressure is reached, the stub 23 is sealed off by welding.

In accordance with a second form of embodiment of the invention, depicted in FIGS. 9 and 10, a plurality of intercommunicating contiguous chambers are associated together. The window is formed by glass domes 24 rigidly united to one another. Similarly, the end-face is formed by a plurality of domes 25 substantially identical to the domes 24 but in which one of the domes 25 is replaced by a cone 26 of the same height as the cone in the precedingly described form of embodiment. A single peripheral seal 27 is made in order to render the chamber airtight.

Intermediate partition walls 28 bearing against each other in pairs are incorporated in order to withstand the effects of the negative pressure prevailing inside the chamber. A single port in partition walls 28 is provided to accomodate the unions 29 for interconnecting the succession of coils similar to those described hereinbefore. Said coils can be interconnected either in series or in parallel.

Entry and exit is effected through the neck of the single cone provided for a chamber. Such cone may be disposed, say, at the centre of an arrangement of the kind illustrated in FIG. 10, which depicts eight peripheral chambers and a central chamber for passage of the input and output conduits.

We claim:

1. A solar energy absorber unit of the evacuated flat-plate collector type, comprising the combination of:
a gastight enclosure designed for long-duration maintenance inside thereof of a high-order vacuum, said enclosure being made up of two opposite half-shells of glass which are glass-welded to each other all along their mating peripheries to form together an integral all-glass, airtight envelope having a generally flattened front-side window designed for exposure to the sun and a corresponding rear-side closure opposite said front-side window, a solar-radiation flat-plate collector suspended inside said enclosure by a light-weight low-conduction suspension secured to the wall of said envelope, to thereby stretch out behind said front-side window in non-conductive thermal relationship with said wall, at least the sun-exposed frontside face of said flat-plate collector bearing a selective coating adapted to increase solar radiation absorption and reduce infrared emission, and a radiant screen formed of sheet material having low infrared emissivity, and in spaced relationship between said flat-plate collector and said rear-side closure, adjacent and generally parallel to the non sun-exposed rear-side face of said flat-plate collector to minimize radiation losses thereof and said solar screen being supported from said flat plate collector and out of physical contact with said rear side closure.

2. Solar unit as claimed in claim 1, wherein said radiant screen is connected mechanically to, and supported by, said flat-plate collector, whereby the whole assembly of said flat-plate collector and radiant screen is suspended inside said enclosure by said light-weight low-conduction suspension.

3. Solar unit as claimed in claim 2, wherein said radiant screen comprises raised ends forming spacer elements designed to provide a very narrow gap only between said flat-plate collector and said radiant screen.

4. Solar unit as claimed in claim 1, wherein said rear-side closure has a generally cone-shaped portion tapering away from said front-side window towards a terminal neck.

5. Solar unit as claimed in claim 4, comprising tubular means for conveying heat absorbed by said flat-plate collector to the outside of said enclosure, said tubular means comprising fluid input and output metal conduits traversing in a gastight relation said rear-side closure adjacent said neck thereof, across a glass-to-metal weld for sealing said enclosure.

6. Solar unit as claimed in claim 5, further comprising a suction stub traversing in a gastight relation said rear-side closure adjacent said tubular means, for evacuating said enclosure, and a getter introduced into said enclosure to remove remaining traces of gas therein.

7. Solar units as claimed in claim 1, wherein each of said half-shells is formed of a unitary glass slab made up of a plurality of juxtaposed dome-shaped elements integral to each other and in checkerboard formation, the two opposite glass slabs being glass-welded to one another along their overall periphery.

8. Solar unit as claimed in claim 7, further comprising intermediate partition struts interposed between said front-side window and said rear-side closure, for strengthening said envelope against collapse under external pressure.

* * * * *